United States Patent
Brown (10) Patent No.: US 6,801,362 B1
(45) Date of Patent: Oct. 5, 2004

(54) ON-AXIS OPTICAL SYSTEM FOR ILLUMINATION AND PROJECTION OF A REFLECTIVE LCD MICRODISPLAY

(75) Inventor: Robert D. Brown, Portland, OR (US)

(73) Assignee: Rockwell Collins, Cedar Rapids, IA (US)

( * ) Notice: Subject to any disclaimer, the term of this patent is extended or adjusted under 35 U.S.C. 154(b) by 0 days.

(21) Appl. No.: 10/198,495

(22) Filed: Jul. 18, 2002

(51) Int. Cl.[7] .................. G02B 27/10; G02B 27/14; G03B 21/00
(52) U.S. Cl. .................. 359/618; 359/634; 353/33
(58) Field of Search .................. 359/618, 629, 359/634, 636, 639, 640; 349/5–7, 97, 113; 353/31, 33, 34

(56) References Cited

U.S. PATENT DOCUMENTS

| | | | | | |
|---|---|---|---|---|---|
| 5,108,172 | A | * | 4/1992 | Flasck | 353/31 |
| 5,381,197 | A | * | 1/1995 | Yoshida et al. | 353/37 |
| 6,036,318 | A | * | 3/2000 | Itoh | 353/31 |
| 6,046,858 | A |   | 4/2000 | Scott et al. | 359/634 |
| 6,076,931 | A |   | 6/2000 | Bone et al. | 353/100 |
| 6,124,911 | A | * | 9/2000 | Nakamura et al. | 349/113 |
| 2003/0063388 | A1 | * | 4/2003 | Berman et al. | 359/618 |
| 2003/0128320 | A1 | * | 7/2003 | Mi et al. | 349/5 |

* cited by examiner

Primary Examiner—Georgia Epps
Assistant Examiner—Alicia M. Harrington
(74) Attorney, Agent, or Firm—Nathan O. Jensen; Kyle Eppele (57) ABSTRACT

The invention is an on-axis optical projection system that displays an image on a projection surface. The optical projection system includes a light source and a reflective LCD microdisplay that modifies light from the light source to form a desired image. The LCD microdisplay reflects light toward the projection surface. A mirror reflects light from the light source in a first optical path toward the LCD microdisplay. The mirror does not affect the polarization orientation of the light reflected thereupon. A plurality of lenses are positioned within the system to focus and direct light along the first optical path and along a second optical path from the microdisplay to the projection surface. The first optical path is substantially opposite in direction to the second optical path. The plurality of lenses includes a dual-purpose lens that simultaneously transmits light along both the first optical path and the second optical path.

12 Claims, 7 Drawing Sheets

ON-AXIS OPTICAL SYSTEM FOR ILLUMINATION AND PROJECTION OF A REFLECTIVE LCD MICRODISPLAY

FIELD OF THE INVENTION

The invention relates to displays, and more particularly, to a compact illumination and projection system that may be used with a reflective LCD microdisplay.

BACKGROUND OF THE INVENTION

Projection display technology has found increasing acceptance with many technologies. Projection displays modify light from light source to form a desired image and project the desired image, using optical elements such as lenses and mirrors, so that the image may be viewed by a viewer. The projection display may project the desired image onto a wall, for example, or onto a transparent screen so that a viewer on the opposite side of the screen may view the image. Such a transparent screen is used in some projection televisions and avionics displays. Projection displays cost much less than typical flat-panel displays, and are much easier to change as formats and other performance requirements change. Additionally, projection displays, when projected onto a screen, may be set to any desired size by adjusting the position and optical power of the optical elements contained therein. A single projection display "engine" can therefore be used in a wide variety of display formats.

LCD-based projection engines require polarization sensitive optics to discriminate between the light and dark pixels. There are two main types of LCD devices: transmissive devices and reflective devices. Transmissive devices normally have sheet polarizing filters attached to the front and back surfaces and discriminate the light and dark pixels. In contrast, reflective LCDs are illuminated and observed from the same side and therefore require a reflective/transparent polarizing optic to discriminate between the illumination beam and the projected image beam. These polarizing optics are commonly called polarizing beam splitters (PBS), and consist of two glass prisms bonded together to form a cube, with a thin film coating on the bonded interface.

High performance PBSs are bulky and expensive, especially in full color projection designs where three LCDs and three PBSs are used. PBSs also suffer from limited spectral and angular operating ranges, which impacts overall projector performance in terms of size, brightness, contrast, and color.

The drawbacks of using PBSs in an LCD-based optical system have been recognized, and attempts have been made to design an optical system that does not require one or more PBSs. One solution, shown in U.S. Pat. No. 6,076,931 issued to Bone et al. and incorporated by reference herein in its entirety, uses multiple lens groups to focus light on a microdisplay and project a desired image. Because this solution illuminates the reflective microdisplay at an angle (a de-centered design), the lenses in the lens groups are more complex to design and construct than would be required if the microdisplay is illuminated and reflects light substantially orthogonal to its surface (an on-axis design).

It is therefore an object of this invention to provide the most compact and inexpensive optical system while preserving or improving system performance.

It is another object of the invention to provide a display system that is compact enough to be used in environments where the size of the display system is a primary design criterion.

A feature of the invention is a projection display system including at least one optical element that simultaneously focuses and directs oppositely oriented beams of light.

An advantage of the invention is a projection display system having improved optical performance because of the elimination of the PBS.

Another advantage of the invention is a projection display system having a reduced size and component count when compared to other display systems with similar performance characteristics.

SUMMARY OF THE INVENTION

The invention provides an on-axis display system for displaying an image on a projection target. The display system includes a light source and a mirror that reflects light from the light source in a first direction. The mirror substantially maintains the polarization orientation of light reflected thereupon. A reflective microdisplay modifies light from the light source to form a desired image. A first plurality of lenses focuses and directs light from the light source to the microdisplay. A second plurality of lenses focuses and directs the desired image from the microdisplay to the projection target. At least one lens in the first plurality of lenses also directs the desired image from the microdisplay to the projection target.

The invention also provides an on-axis optical projection system that displays an image on a projection surface. The optical projection system includes a light source and a reflective LCD microdisplay that modifies light from the light source to form a desired image. The LCD microdisplay reflects light toward the projection surface. A mirror reflects light from the light source in a first optical path toward the LCD microdisplay. The mirror does not affect the polarization orientation of light reflected thereupon. A plurality of lenses are positioned within the system to focus and direct light along the first optical path and along a second optical path from the microdisplay to the projection surface. The first optical path is substantially opposite in direction to the second optical path. The plurality of lenses includes a dual-purpose lens that simultaneously transmits light along both the first optical path and the second optical path.

The invention further provides a method of projecting an image on a projection surface. According to the method, a light source is provided. Light from the light source is focused along a first optical path, toward a reflective LCD microdisplay, using an optical device that maintains the polarization orientation of light incident thereupon. The reflective LCD microdisplay is used to modify the polarization state of at least part of the light travelling along the first optical path. Light reflected off the microdisplay is directed along a second optical path. The first optical path and the second optical path define substantially opposite directions through a lens assembly. Light is focused toward the projection surface along the second optical path.

DETAILED DESCRIPTION OF THE DRAWINGS

Figure 1:
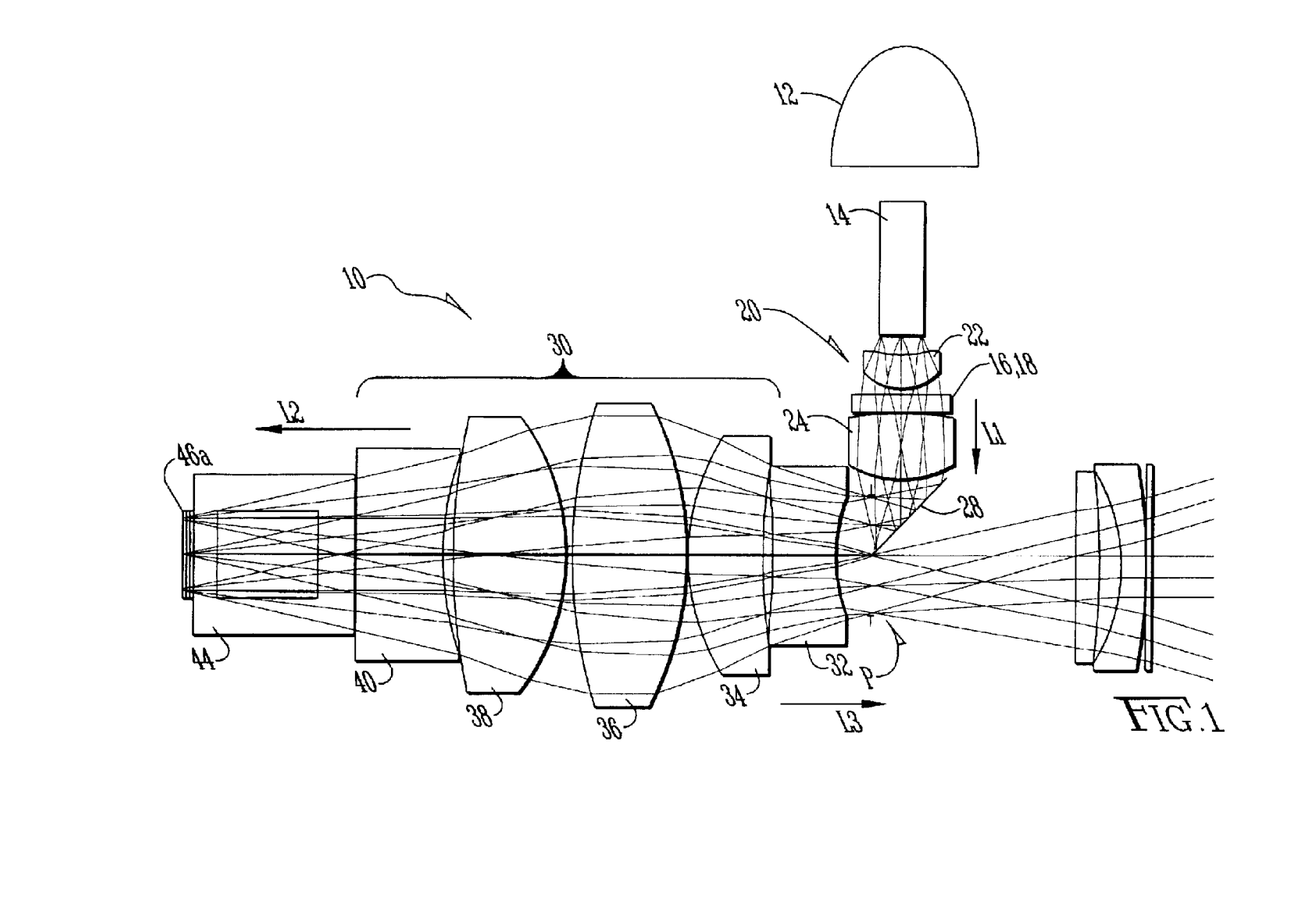
FIG. 1 is a top plan view of an optical system according to an embodiment of the invention.
Figure 2:
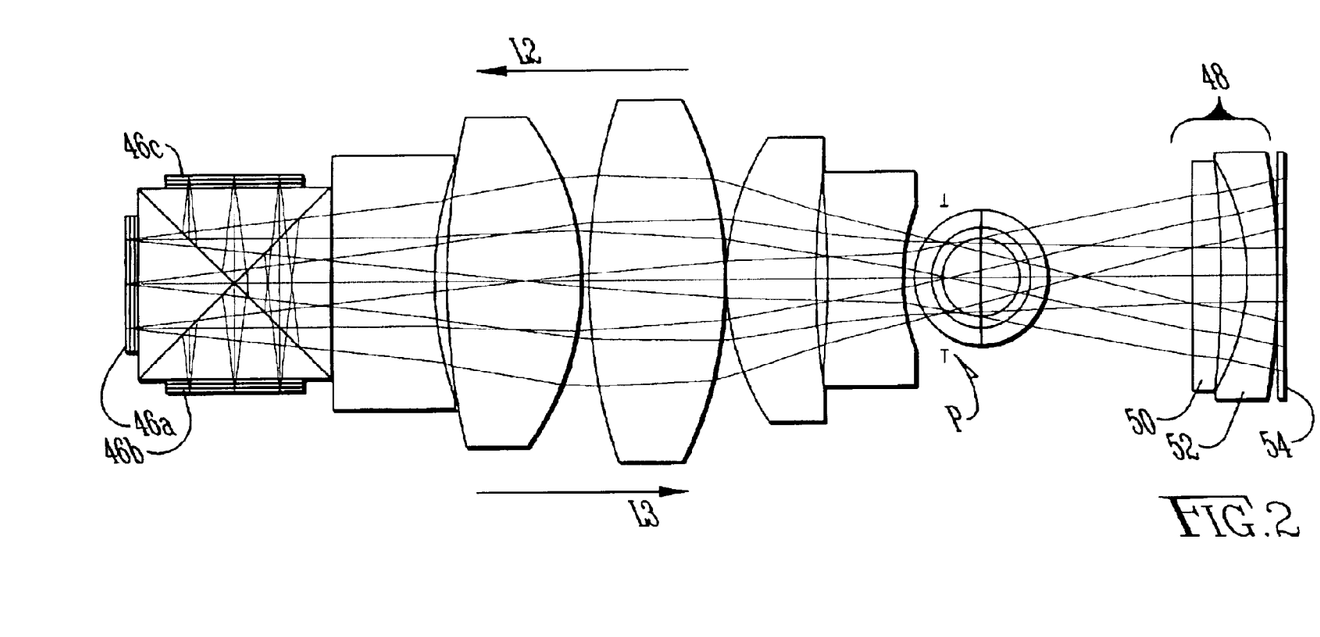
FIG. 2 is a side elevational view of the optical system shown in FIG. 1.

Turning now to the drawings, in which like reference numbers designate like components, an embodiment of the invention is schematically shown in FIGS. 1 and 2. A projection system, designated by reference number 10, includes a light source 12 that projects light in a first direction L1. Light source 12 may be an arc lamp, an LED array, or the like. Light from light source 12 passes through a beam homogenizer 14, which creates a beam of uniform brightness and having a cross-section proportional to the LCD microdisplays to which the beam will be directed (as explained below). The light travels through a first polarizer 16, which is preferably a sheet-type polarization filter. First polarizer 16 allows light having a first predetermined polarization orientation to pass therethrough. A polarization recovery system 18 may also be included separately, or as shown in the Figures, the polarization recovery system may be incorporated with first polarizer 16. Polarization recovery system 18 attempts to usably recover light that did not have the first predetermined polarization orientation. Light travelling in the first direction L1 also passes through a first optics assembly 20 that forms a portion of the illumination optics of the invention. First optics assembly 20 is shown as including lenses 22 and 24, but may include a greater or a fewer number of lenses as required. The optical power of each of lenses 22, 24 may also be varied as required. The lenses of the first optics assembly may be positioned before or after first polarizer 16, or as shown in FIG. 1, the lenses of the first optics assembly may be positioned before and after the first polarizer.

First optics assembly 20 directs light to reflect off of a reflective device such as a mirror 28. Preferably, mirror 28 is sized to properly reflect light onto the LCD microdisplays (as described below). Mirror 28 is positioned in an entrance pupil P of the system and operates to reflect light from first optics assembly 20 in a second direction L2, which together with first direction L1 comprises a first optical path. Mirror 28 does not affect the polarization orientation of light incident thereupon. Light reflected off of mirror 28 passes through a second optics assembly 30. Second optics assembly 30 includes lenses 32, 34, 36, 38, and 40, which are selected and positioned to properly focus and direct the light toward the LCD microdisplays that are to be illuminated by the system. Second optics assembly 30 may include a greater or a fewer number of lenses as required.

Light passing through second optics assembly 30 is directed toward a dichroic beam combiner 44, which is also known as an "x-cube". Dichroic beam combiner 44 splits the light provided by light source 12 (which is preferably a white light) into predefined components, which are preferably red, green, and blue. Each of the predefined components of the light are directed in a different direction toward one of three reflective LCD microdisplays 46a, 46b, 46c. In the depicted embodiment, the green component is transmitted toward LCD microdisplay 46a, the red component is transmitted toward LCD microdisplay 46b, and the blue component is transmitted toward microdisplay 46c. Dichroic beam combiner 44 may be of the type manufactured under the reference P/N 9814 by Optec s.r.l. of Milan, Italy. As is known in the art, each LCD microdisplay is comprised of a plurality of pixels. According to one method of operating the microdisplays, if a particular pixel is desired to be turned "on," the polarization orientation of the light reflecting upon that pixel is rotated 90 degrees (which is a second predetermined polarization orientation) by the LCD microdisplay. If a particular pixel is desired to be turned "off," the polarization orientation of the light reflecting upon that pixel is unmodified by the LCD microdisplay.

Figure 3:
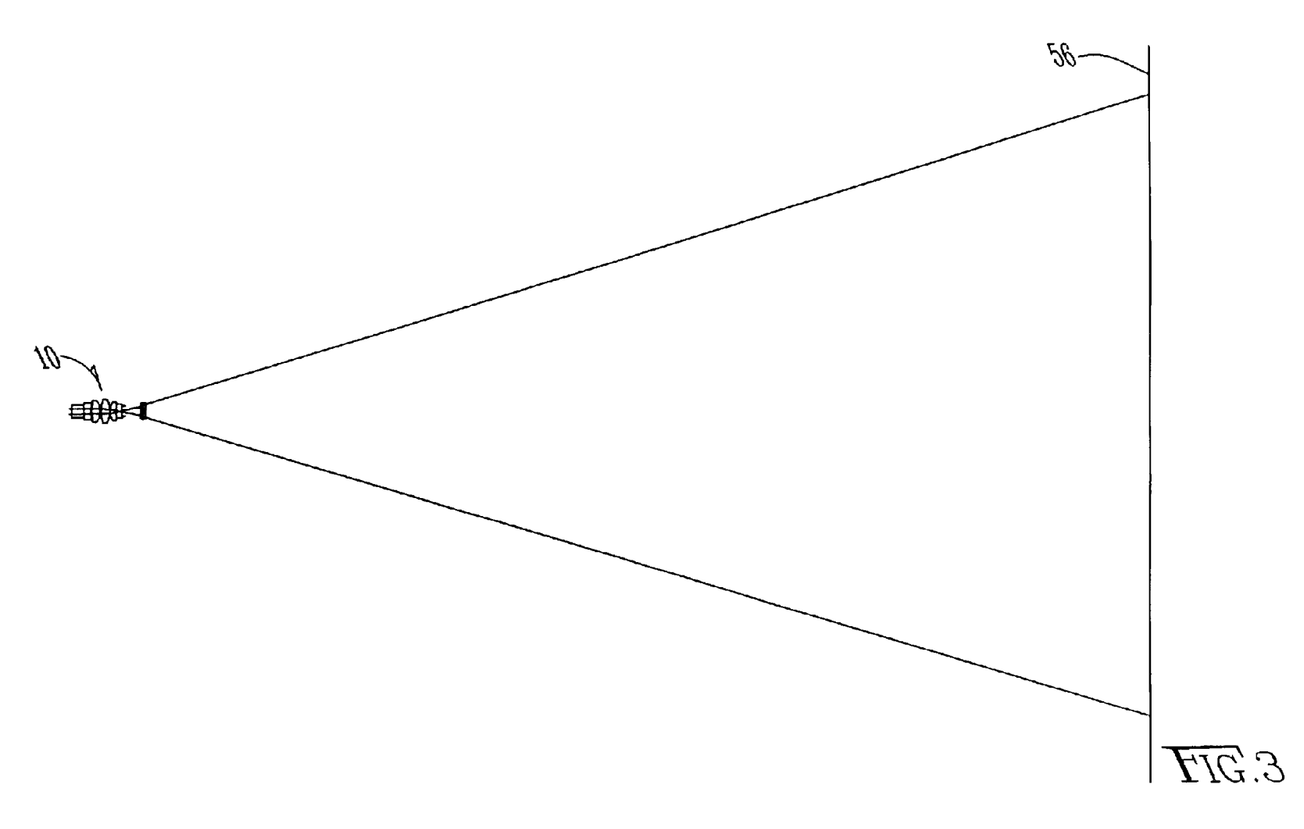
FIG. 3 is another side elevational view of the optical system shown in FIGS. 1 and 2.

After the polarization of the light is selectively modified by the pixels in each of the LCD microdisplays 46a, 46b, 46c, the light is reflected back through dichroic beam combiner 44 and is there combined into a single beam of light that travels in a third direction L3 through second optics assembly 30. Third direction L3 is substantially opposite second direction L2 and comprises a second optical path through the second optics assembly. However, due to the angle of incidence of the light upon the LCD microdisplays 46a, 46b, and 46c, light traveling in the third direction L3 exits the second optics assembly and passes through entrance pupil P without contacting mirror 28. The light then passes through a third optics assembly 48 (FIG. 2). As can be seen, third optics assembly 48 may include lenses 50 and 52. However, the size, position, number, and/or optical power of the lenses comprising third optics assembly 48 may be varied as required. A second polarizer 54, which is preferably a sheet-type polarization filter, is disposed after the third optics assembly and is positioned so that only light oriented in the second predetermined polarization orientation is permitted to pass therethrough. In other words, only light that had its polarization rotated by the pixels of one of the LCD microdisplays is permitted to pass through second polarizer 54. Light that passes through the second polarizer is projected to a projection target or surface 56, which is shown in FIG. 3. The projection surface may be a wall or other reflective surface. Alternatively, the projection surface may be a substantially transparent rear projection screen that may be used in a television, avionics display, or other viewing apparatus.

As can be seen from the above description of the invention, the lenses in second optics assembly 30 are selected and positioned to accurately transmit the homogenous beam of light that is reflected off of mirror 28 to the LCD microdisplays. Further, the lenses in second optics assembly 30 must cooperate to cause light to contact the microdisplays at an angle such that light reflected off of the microdisplays are again directed through the second optics assembly and through entrance pupil P without contacting mirror 28.

First optics assembly 20 and the second optics assembly may be considered to be an illumination optics assembly because they serve to illuminate the LCD microdisplays with light from light source 12. The second optics assembly and third optics assembly 48 may be considered to be a projection optics assembly because they project light from the LCD microdisplays to projection surface 56. A feature of the invention is that second optics assembly 30 illuminates the microdisplays as well as projects light to projection screen 54. These dual functions are simultaneously performed on light paths that are travelling in substantially opposite directions. This double use of some of the lenses in the system reduces the total number of lenses required in a reflective LCD microdisplay projection system. The size required for such a system is also significantly reduced when compared to known microdisplay projection systems. Furthermore, because light travels through second optics assembly 30 in substantially opposite directions L2 and L3, the invention is considered to be an "on-axis" projection system. This is in contrast to "off-axis" or "de-centered"

projection systems in which illumination of and projection from the reflective microdisplay occurs at an angle.

Because optical system 10 is "half-illuminated," it must be capable of using a beam of light twice the intended size. The lens design is not hard to produce, however, because the optical correction only applies over the diameter of the illumination beam.

Figure 4:
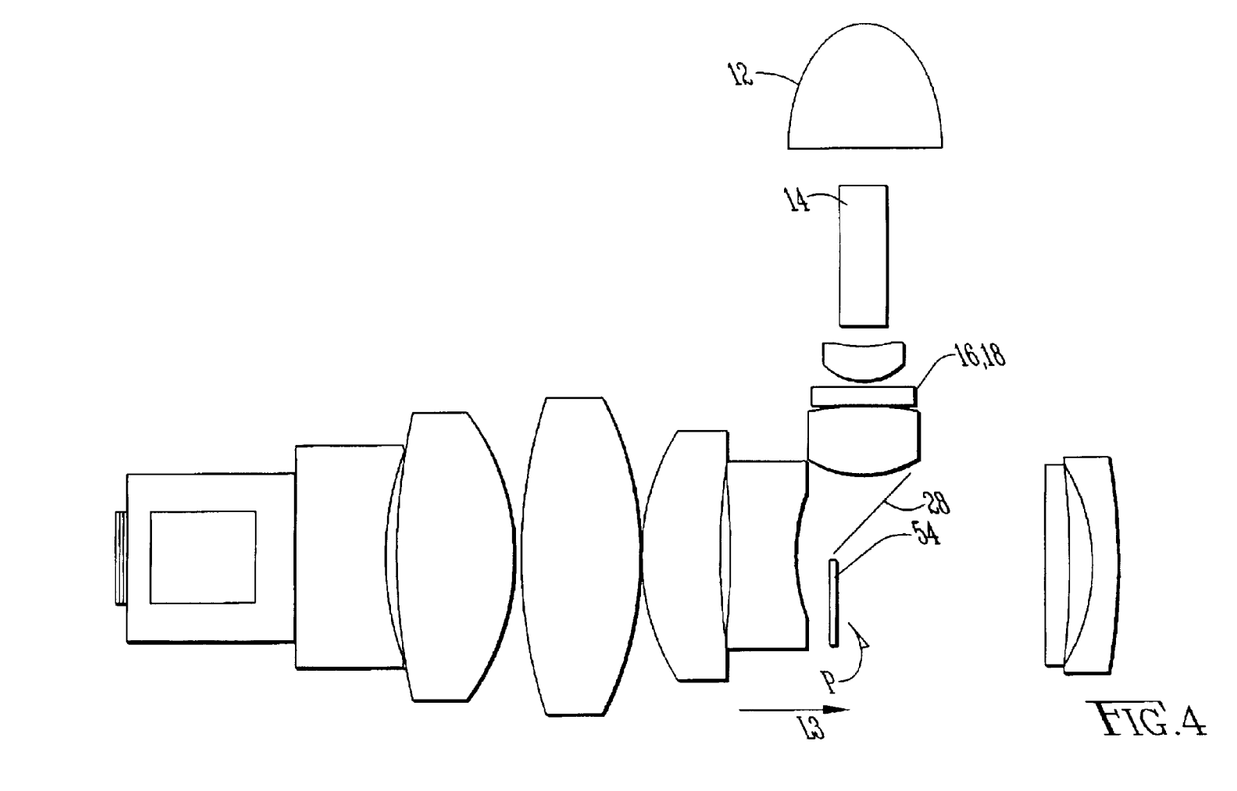
FIG. 4 is a top plan view of an optical system according to another embodiment of the invention.

The placement of the polarizers may be varied. For example, FIG. 4 shows second polarizer 54 placed within entrance pupil P and positioned to filter light travelling in third direction L3. As with the embodiment depicted in FIGS. 1 and 2, the polarization orientation of the first polarizer is 90 degrees from the polarization orientation of the second polarizer.

Figure 5:
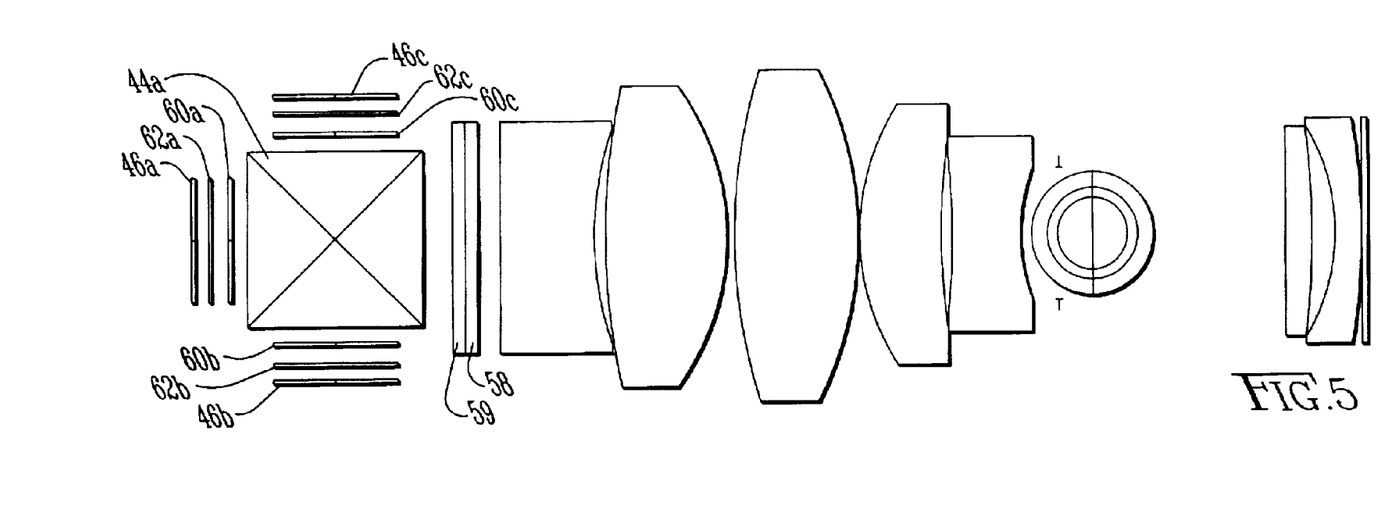
FIG. 5 is a side elevational view of an optical system according to another embodiment of the invention.

A commonly available type of dichroic beam combiner is one which optimally splits and combines two of the three colors in one polarization orientation and splits and combines the third of the three colors in an orthogonal polarization orientation. For example, a dichroic beam combiner may be configured to optimally split and combine red and blue light components that are in an s polarization orientation or channel, while the green light component is optimally split and combined when in a p polarization orientation or channel. Such a dichroic beam combiner is known as an "sps-type" combiner and is less expensive than beam combiners that are optimized to split and combine light components having the same polarization orientations. FIG. 5 shows one way in which the invention may use an sps-type dichroic combiner, which is indicated by reference number 44a. Prior to entering sps-type dichroic beam combiner 44a, light passes through a polarizer 58 that orients the light into the s polarization channel. Light then passes through a retarder 59 that orients the green component of the light in the p channel but permits red and blue components to pass through without changing their polarization orientations. The green light component is directed by dichroic beam combiner 44a toward a sheet polarizer 60a, which permits light oriented in the p orientation to pass therethrough. The red and blue light components are directed by dichroic beam combiner 44a toward sheet polarizers 60b and 60c, respectively, which permit light oriented in the s orientation to pass therethrough. The light reflected off each microdisplay passes through sheet polarizers 60a–c, respectively, the portion of incoming light that is not part of the desired image being filtered by the respective sheet polarizers. As with previous embodiments, dichroic beam combiner 44a then combines the red, green and blue light components. Retarder 59 rotates the polarization of the green light component of the combined light from the p state to the s state, thereby enabling the combined light to pass through polarizer 58 unobstructed.

In another aspect of the embodiment depicted in FIG. 5, quarter wavelength retarders 62a, 62b, 62c, are disposed between sheet polarizers 60a, 60b, 60c and LCD microdisplays 46a, 46b, 46c, respectively. By converting the polarization of light between linear and rotational states, quarter wavelength retarders 62a, 62b, 62c create a reverse image or a "negative" image of light passing therethrough. Quarter wavelength retarders are required because the LCD microdisplays are designed to produce a high-contrast positive image when viewed under crossed polarization (such as a PBS), but this embodiment uses a single polarizer which would produce a low-contrast negative image if there were no quarter wave retarders. As quarter wavelength retarders are known in the art, it is not considered necessary to further discuss the method of operation of the retarders. Any known type of quarter-wavelength retarder may be used with the invention, so long as said retarder conforms to the design specifications of the desired optical system.

The placement of polarizers 60a, 60b, 60c adjacent the LCD, as depicted in FIG. 5, permits the invention to take advantage of an inexpensive sps-type dichroic beam combiner. However, polarizers 60a–c may be aligned in any combination to take advantage of other types of beam combiners (such as an "sss-type" combiner).

Figure 6:
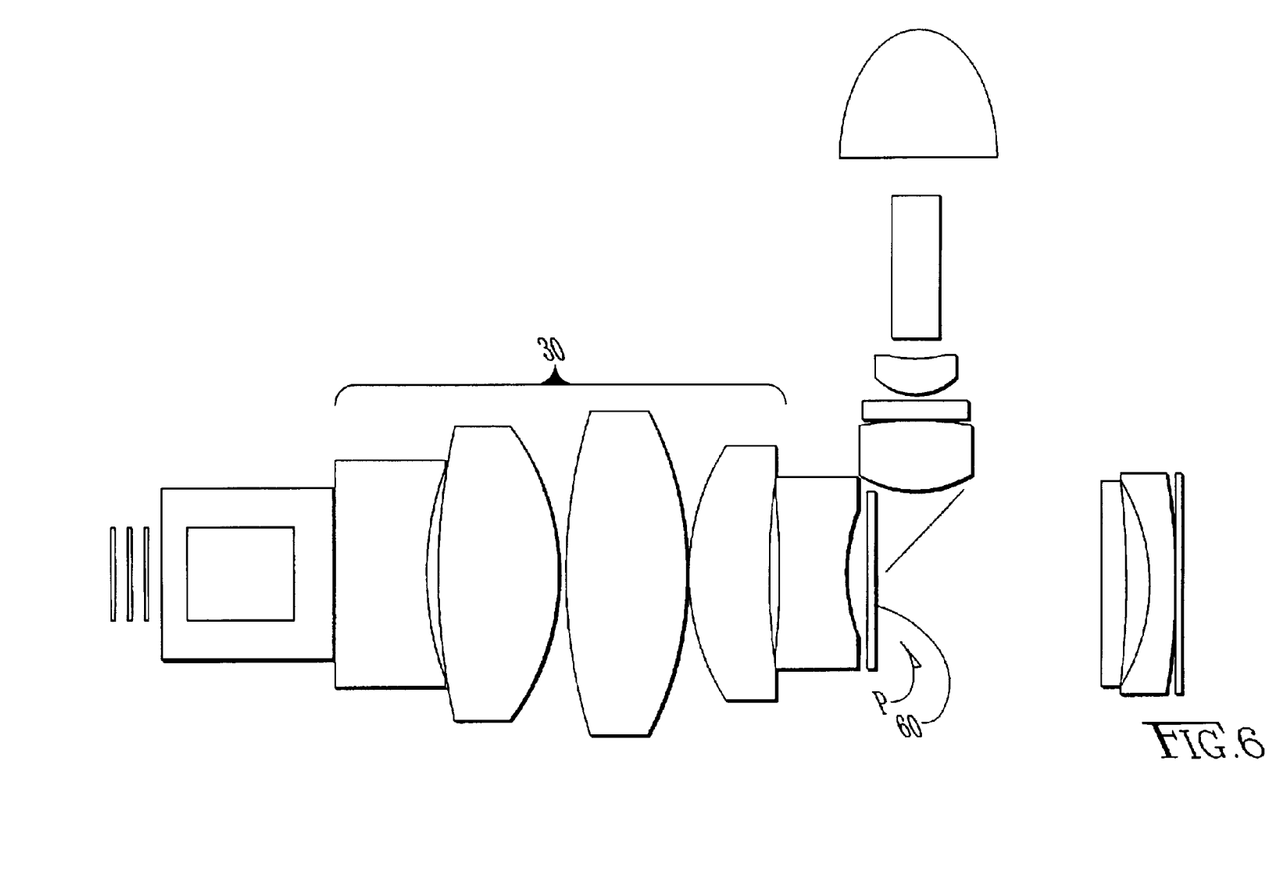
FIG. 6 is a top plan view of an optical system according to yet another embodiment of the invention.

The embodiment shown in FIG. 5 also differs from previous embodiments in that a single polarizer 58 replaces polarizers 16 and 54. The use of a single polarizer 58 eliminates the need to mount and align two polarizers 90 degrees from each other. Polarizer 58 may be alternatively be positioned elsewhere, such as adjacent or within pupil P as shown in FIG. 6. Polarizer may also be placed between lenses of second optics assembly 30, if desired. If an sps-type dichroic beam combiner is used in the embodiment shown in FIG. 6, a retarder similar to retarder 59 in FIG. 5 may also be included. It is possible to combine polarizer 58 and the retarder into a single optical element.

Figure 7:
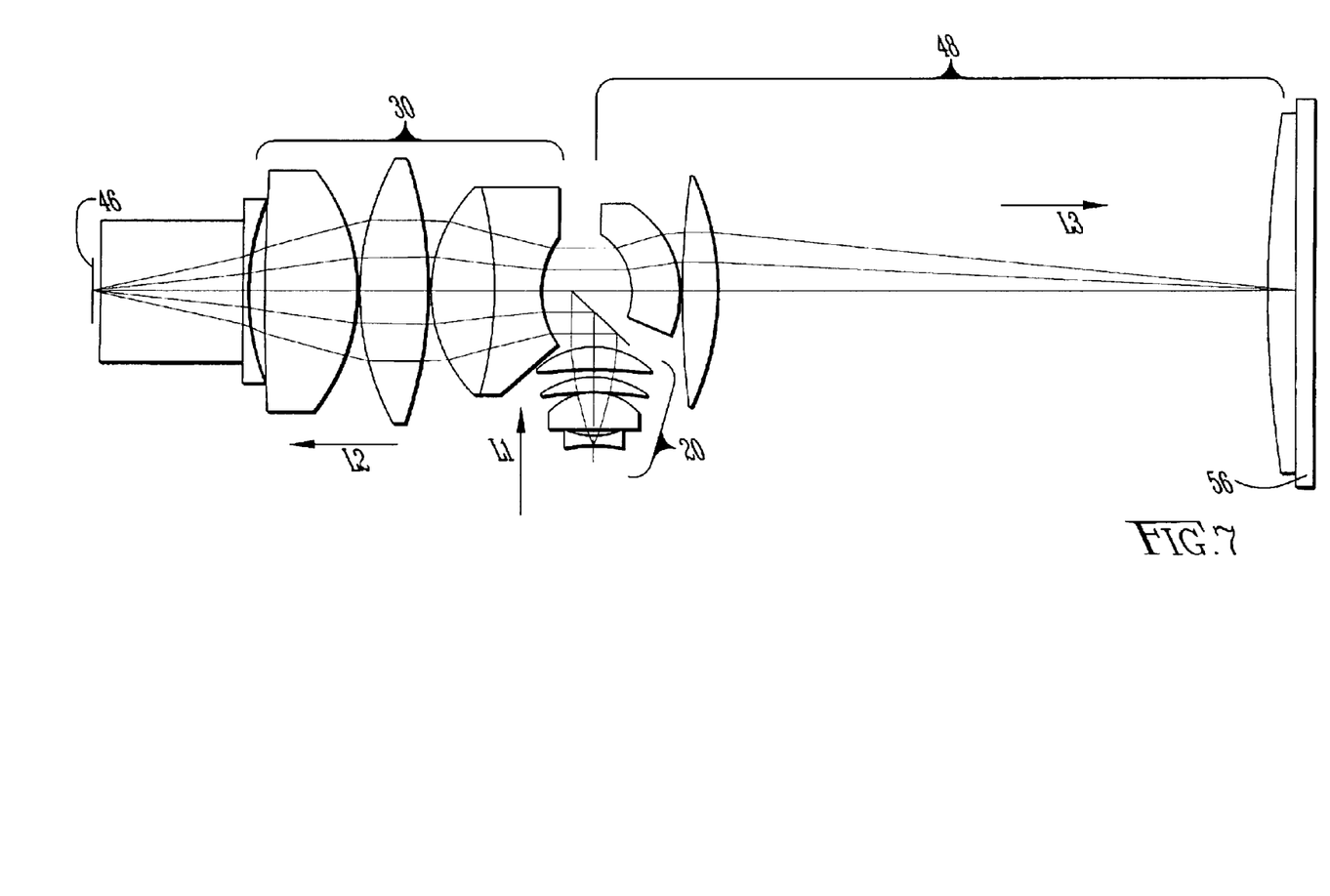
FIG. 7 is a top plan view of an optical system according to still another embodiment of the invention.

Another embodiment of the invention, depicted in FIG. 7, demonstrates that the number, power, and positioning of lenses in first, second, and third optics assemblies 20, 30, and 48 may be varied according to the requirements of the system. In addition, a single reflective LCD microdisplay 46 may be used if a single color image is desired as the output of the system. Polarizers are not shown in this embodiment, but may be placed as described in previous embodiments. Additionally, projection surface 56 is depicted as a transparent diffusive rear projection screen. If the system is used in an avionics head-up display, the rear projection screen may be bolted or otherwise attached to a relay lens assembly (not shown), which would then project the image to a head-up display combiner (not shown).

The invention may be varied in other ways while keeping with the spirit of the invention. For instance, the lenses in the first, second and third optical assemblies are all preferably comprised of spherical surfaces. If it is desired to further reduce the number of lenses in system 10, lenses with aspherical surfaces may alternately be used. It is recognized, however, that the use of aspherical lenses may make system 10 more complex, more expensive, and more dependent on precise lens placement. Depending on the application, such drawbacks of aspherical lenses may or may not outweigh the advantages of using aspherical lenses in system 10. Also, additional reflective devices may be used to modify the light paths as desired. Lastly, the invention is depicted using high-quality sheet-type polarizers, although other types or geometries of polarizing materials may alternatively be used.

An advantage of the invention is the use of the second optics assembly to simultaneously focus and direct light along first and second substantially opposite optical paths. This dual use of lenses reduces the number of lenses necessary to create a desired image, and the overall materials cost of the invention is also reduced.

Another advantage is that the size of the system is reduced when compared to known projection systems. This size reduction increases the applicability of LCD microdisplay projection systems, especially in avionics and head-up displays where space is at a premium.

Still another advantage is that the dual optical path permits the use of reflective LCD microdisplays in projection systems while eliminating multiple optical systems and the expensive polarizing beam splitters that prior on-axis projection systems require.

Yet another advantage is that the dual optical path allows the optical system to be on-axis, which is preferable to prior off-axis systems which suffer from higher optical aberrations due to the asymmetric positioning of components.

While the invention has been disclosed in its preferred form, the specific embodiments thereof as disclosed and illustrated herein are not to be considered in a limiting sense as numerous variations are possible. The subject matter of the invention includes all novel and non-obvious combinations and subcombinations of the various elements, features, functions and/or properties disclosed herein. No single feature, function, element or property of the disclosed embodiments is essential to all of the disclosed inventions. Similarly, where the claims recite "a" or "a first" element or the equivalent thereof, such claims should be understood to include incorporation of one or more such elements, neither requiring nor excluding two or more such elements.

It is believed that the following claims particularly point out certain combinations and subcombinations that are directed to the disclosed inventions and are novel and non-obvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower or equal in scope to the original claims, are also regarded as included within the subject matter of the invention of the present disclosure.

What is claimed is:

1. An on-axis display system for displaying an image on a projection target, comprising:

a light source;

a mirror that reflects light from the light source in a first direction, the mirror substantially maintaining the polarization orientation of light reflected thereupon;

a reflective microdisplay that modifies light from the light source to form a desired image;

a first plurality of lenses that focuses and directs light from the light source to the microdisplay;

a second plurality of lenses that focuses and directs the desired image from the microdisplay to the projection target;

wherein at least one lens in the first plurality of lenses also directs the desired image from the microdisplay to the projection target;

wherein the microdisplay is a first microdisplay, and further including a second microdisplay and a third microdisplay; and a beam combiner positioned adjacent the first, second, and third microdisplays, said beam combiner configured to split light from the light source into predetermined color components and direct the split light to one of the first, second, and third microdisplays.

2. The display system of claim 1, wherein light traveling from the light source through the at least one lens travels in the first direction, and wherein the desired image traveling from the microdisplay toward the projection target through the at least one lens travels in a second direction, the second direction being substantially opposite the first direction.

3. The display system of claim 1, wherein the mirror is disposed adjacent the at least one lens.

4. The display system of claim 1, wherein the predetermined color components are red, green and blue, and further wherein the red color component is directed to the first microdisplay to be modified thereby, the green color component is directed to the second microdisplay to be modified thereby, and the blue color component is directed to the third microdisplay to be modified thereby; and wherein the beam combiner combines the red, green and blue color components reflected off of the first, second and third microdisplays, respectively, and directs the combined color components toward the at least one lens.

5. An on-axis optical projection system that displays an image on a projection surface, comprising:

a light source;

a reflective LCD microdisplay that modifies light from the light source to form a desired image, the LCD microdisplay further reflecting light toward the protection surface;

a mirror that reflects light from the light souse in a first optical path toward the reflective LCD microdisplay, the mirror substantially maintaining the polarization orientation of the light reflected thereupon;

a plurality of lenses positioned within the system to focus and direct light along the first optical path and along a second optical path from the microdisplay to the protection surface, wherein the first optical path is substantially opposite in direction to the second optical path;

wherein the plurality of lenses includes a dual-purpose lens that simultaneously transmits light along both the first optical path and the second optical path, and wherein the LCD microdisplay is a first LCD microdisplay, and further including a second LCD microdisplay and a third LCD microdisplay;

a beam combiner positioned adjacent the first, second, and third LCD microdisplays, said beam combiner configured to split light traveling along the first optical path into red, green and blue color components and direct the split light to one or more of the first, second, and third microdisplays, wherein the red color component is directed by the beam combiner to the first LCD microdisplay to be modified thereby, the green color component is directed by the beam combiner to the second LCD microdisplay to be modified thereby, and the blue color component is directed by the beam combiner to the third LCD microdisplay to be modified thereby, and wherein the beam combiner combines the red, green, and blue color components reflected off of the first, second and third LCD microdisplays, respectively, and directs the combined color components along the second optical path;

an optical element that modifies the polarization orientation of only one of the red, green, and blue color components prior to the color components entering the beam combiner along the first optical path, and wherein the beam combiner splits and combines the modified one of the red, green and blue color components in a first polarization orientation, and further wherein the beam combiner splits and combines the other of the red, green, and blue color components in a second polarization orientation that is orthogonal to the first polarization orientation.

6. The optical projection system of claim 5, further including a first sheet polarizer positioned to filter light prior to the light reaching the LCD microdisplay, the first sheet polarizer filtering light in a first polarization orientation, wherein the LCD microdisplay modifies light traveling in the first optical path by selectively rotating the polarization orientation of part of the light substantially 90 degrees with respect to the first polarization orientation, the LCD microdisplay further reflecting modified and unmodified light along the second optical path.

7. The optical projection system of claim 6, wherein the first sheet polarizer is situated adjacent the mirror.

8. The optical projection system of claim 6, wherein the first sheet polarizer is positioned to filter light travelling in the first optical path and the second optical path.

9. The optical projection system of claim 6, wherein the first sheet polarizer is disposed adjacent the microdisplay.

10. The optical projection system of claim 6, further including a second sheet polarizer positioned to filter light travelling in the second optical path, the second sheet polarizer filtering light in a second polarization orientation.

11. The optical projection system of claim 10, wherein the second polarization orientation is substantially orthogonal to the first polarization orientation.

12. The optical projection system of claim 10, wherein the second sheet polarizer is disposed proximal the LCD microdisplay, and wherein the second polarization orientation is substantially parallel to the first polarization orientation.

* * * * *